Patented Apr. 18, 1944

2,346,708

UNITED STATES PATENT OFFICE 2,346,708

UREA-FORMALDEHYDE CONDENSATION PRODUCT

Leonard Smidth, Houston, Tex.

No Drawing. Application January 11, 1939,
Serial No. 250,414

21 Claims. (Cl. 18—55)

This invention relates to an improved method of manufacturing thermosetting molding compositions from synthetic resins and to the production of molded articles therefrom. It also relates to new and improved urea-formaldehyde molding compositions which may be used in hot molds as well as in cold molds, such compositions being particularly adapted for use in injection molding processes.

Synthetic resins used to produce molding compositions are of two types: they are thermosetting resins, which first soften and then harden under the action of heat; and thermoplastic resins, which soften under the action of heat and retain this property indefinitely while heated. Thermosetting resins have the advantage that they are finally inert and infusible after they have been hardened by heat. However, thermoset molded products are generally more expensive to mold than thermoplastic resin products, because they require heating in the molds, usually under pressure, for various periods in order to harden them. Moreover, as heretofore produced, they are not susceptible of manufacture by the well-known injection molding process, because such process requires holding a large volume of the material to be molded at relatively high temperatures in the injection cylinder, and at these high temperatures the material of the prior art tends to harden or gelatinize before it can be introduced into the mold.

According to the present invention, there is provided a method of making thermoset molded products, which method does not require heating of the material in the mold to set or harden them. Therefore the molded articles can be rapidly formed, and can be promptly ejected from the mold practically immediately after they are formed.

More specifically, I have found that by causing the reaction between urea and formaldehyde to go substantially to completion in the presence of a liquid, such as water, with the aid of intensive mechanical treatment or "working," I can prepare a composition particularly adapted for injection molding. The water present prevents the hardening or solidification of the resin as long as it is retained. In a closed and heated injection cylinder there is no path for the water to escape and hence the composition remains liquid or mobile therein. The composition, therefore, can be squirted from the heated injection cylinder into a cold or cooled mold, and the molded material can thereafter be removed from the mold in solid, shaped form, without requiring a heat treatment or a heating for any substantial length of time. The entire molding process can be completed in a very short time, in some cases a few seconds, thus reducing the cost of equipment required for a given output. The molded articles are then simply allowed to air dry, or they may be heated in an oven, after which operation they possess hardness, inertness and other properties, similar to those possessed by articles which have been molded and set by heat in accordance with prior practice.

It is my belief that the usual and principal reaction between urea and formaldehyde under neutral or acid conditions regardless of proportions takes place as follows:

$$2NH_2CONH_2 + 3CH_2O \rightleftharpoons C_5H_{10}N_4O_3 + 2H_2O$$

The reaction is an equilibrium one and shifts more to the right in the presence of the exact amount of urea required to combine with all of the formaldehyde of the reaction, namely 2 mols of formaldehyde to 1.33 of urea (same as 1.5 to 1). The presence of acids and the elevated temperature cause the reaction to shift to the right, lower pH values, higher temperatures and longer reaction periods being more effective in bringing about this result. This explanation represents the ordinary course of the reaction and does not take into account the differences in reaction in the liquid state and the solid state, the degree of polymerization, hydration, distance between the gel particles, and other factors. The formula and the described reaction, however, will assist in understanding the nature of the present invention.

Broadly considered, the invention involves reacting urea and formaldehyde in the proper proportions as hereinafter described under those conditions of acidity, temperature and time aided by a suitable mechanical treatment which substantially complete the condensation reaction, and liberation of water of reaction, the reaction product being combined by such treatment or by an additional treatment with water or other volatile liquid to retain the flowing characteristics. The resulting composition has an excellent flow while in the heated state, is substantially solid and rigid when cold and will retain its plastic quality as long as the moisture or liquid is present. Thus, if the proper amount of water or liquid is present in the mass to be molded, the final hardening of the material is prevented, but as soon as the molded composition is removed from the mold and left exposed to the air, the liquid or moisture evaporates spontaneously or can be driven out rapidly by heat. The spontaneous separation or giving off of water by the mass is called synaeresis and takes place slowly or rapidly in proportion to the acidity of the material.

The proportion of formaldehyde to urea best suited for the preparation of the products of the present invention are two mols of formaldehyde to about 1.33 mols of urea. Proportions near this optimum can be used to give improved products, for example, two mols of formaldehyde to from 1.05 to 1.40 mols of urea, or more satisfactorily, two mols of formaldehyde to 1.1 to 1.33 mols of urea.

Since the reaction must be substantially completed during the production of the liquid molding composition, the acidity, temperature and time of the reaction must be correlated to obtain such result. The acidity should be considered, first in connection with the initial preparation of the molding composition and, second, in connection with the completed molding composition. In order to complete the reaction before the actual molding, it is desirable to use as high an acidity during preparation as is possible with proper control such that the time and the temperature required are at a minimum. Practically considered, pH values below 4 are unsuitable, for the urea-formaldehyde condensation products produced under such conditions harden too rapidly, with the result that an excessive quantity of water has to be added to permit working of the material and to keep it sufficiently plastic for the later molding operation. At pH values of 4.5–5.5, reaction takes place quickly, but the product does not stiffen or harden too rapidly (if the acidity or temperature is not too high) for the completion of the reaction. At pH values above 5.5 reaction takes longer and material usually has to be worked at a higher temperature or for a longer time or both.

The acidity of the completed molding composition determines the rate at which the combined water in the molding composition or molded product is given off (synaeresis). Since it is desirable to have the molded product harden as rapidly as possible after molding, it is advantageous that the acidity be comparatively high. If the composition is to be kept or stored for some time before using, it is desirable that the acidity be somewhat lower. In accordance with a preferred embodiment of the invention the process is carried out at a comparatively high acidity to complete the reaction, and thereafter the acidity is reduced such that the flowing qualities will be retained as long as necessary or until the actual molding operation is effected.

Since urea-formaldehyde condensation products decompose at temperatures above 150° C., the material should neither be worked nor molded at temperatures of such magnitude. The higher the temperature at a given acidity, the shorter the time required for complete condensation. Elevated temperatures, however, are not necessary, for the material can be worked in the cold to complete the reaction, provided there is sufficient acid present. Between these two extremes, the operator will find a satisfactory combination of working temperature and acidity that will give the proper degree of reaction in a minimum of time, without danger of decomposition, and yield products of the optimum desirable properties.

The completion of the reaction before molding and the combination with water or other liquid is preferably carried out by intensively working or mixing the condensation product with the liquid on heated rolls or similar apparatus. Suitable rolls are those of the type used in the rubber industry and preferably are of the differential kind, that is, wherein one roll is rotated at different speed from the other. The working may alternatively be effected through the use of Banbury mixers, of an apparatus effecting extrusion through small orifices, or of Werner and Pfleiderer mixers fitted with means for putting pressure on the material while mixing, or of other similar apparatus which will intensively mix the material while it is in the solid reaction stage or pliable state, and preferably while both heat and pressure are being applied.

The insensitivity to heat and boiling water of the molded product obtained by the present process may be explained by the fact that the reaction is carried further toward completion, because part of the reactive particles which usually cannot completely react because they are fixed in the solid material are brought into the reactive zone by the water and the intensive working of the solid material.

In the manufacture of commercial urea-formaldehyde molding compositions by prior processes the reaction is carried out to a point at which most of the water of condensation is liberated and dried off, the composition formed later being introduced into a hot mold where the reaction continues and the remaining water formed by the reaction is liberated, a cellulose filler being used to absorb the water of reaction, with the result that a final hardened material is produced. In commercial materials made according to prior processes the loss of weight during molding is roughly from 4 to 8% and in some cases may be slightly higher or slightly lower. The amount of water in the molding composition including that given off by the reaction and that present as such can be determined easily by measuring the weight loss occurring as a result of heating the composition. If a molding composition is dried until there is no further loss of weight the composition will have little or no flow in the hot mold. On the other hand, if the composition is not sufficiently dried, blisters and voids will form during the hot molding of the composition.

The difference between the molding material made by this process and commercial compositions made by prior art is that in the present process the reaction is completed with the aid of water and the water present is further used to increase the flow of the composition, whereas in the production of the prior art molding compositions, the reaction is not completed and therefore they do not need water to increase the flow in the hot mold. Certain prior processes use water to increase flow, but molded articles made in this way are decidedly inferior to those made by the present process, because the water added in the prior processes retards or stops the reaction so that it will not go to completion during the hot molding process. Water in the present process is used as a "colloiding" agent, to permit proper working of the material, to prevent overheating and hardening until after the reaction is complete and to produce a homogeneous material. Molding powders made by prior processes which have been heated or overdried until there is no remaining flow and then mixed with sufficient water to make them flow lack the "structure" of the compositions made by the present process, for they produce comparatively low grade molded articles of less strength and lacking other desirable physical properties. Molded compositions made by prior processes are relatively easy to grind whereas the compositions herein prepared are tough and difficult to grind.

Because of the lack of plasticity of the present molding composition in the absence of water, more water will be required to make it flow than is usually present or formed in prior art compositions during the hot molding process. The amount required will be above 8% or 10% and up to 20%. Only enough water should be used to make the composition sufficiently plastic to flow under the conditions to be used in molding, because the excess water or liquid causes too much shrinkage in the molded article.

The present invention contemplates as an alternative procedure the use of small amounts of substances of the nature of sorbitol, manitol, glycerol and other substances having affinity for or the ability to retain water. Although such materials lead to products superior for certain purposes, their water resistance is generally reduced by the substitution. Other plasticizing materials which may be utilized instead of water in the composition and added at any time during the process include alcohols, ketones and other volatile compounds and non-volatile or relatively non-volatile compounds, such as benzyl alcohol, triphenyl phosphate, diethyl and dibutyl esters of oxalic, tartaric and phthallic acids, para-toluol, sulphonamide resin, camphol, acetanilide and other like compounds.

Where plasticizing agents other than water are used, non-volatile solvents for the plasticizing medium may be employed. Furthermore, if solvents of greater volatility than water are used to plasticize the composition, such solvents can be quickly driven off by a short drying process after the composition has been molded.

The presence of the water or other solvent as a plasticizing agents is not novel per se and hence this general idea is not the present invention. In operation of the invention the water must be combined in some physical or chemical manner, not completely understood, with the composition, the water or other solvent being evenly distributed throughout the material. Water or other solvent must be present throughout the whole composition. Synaeresis must not be permitted to take place, for in such case the water is forced to the surface and it can no longer serve the function of plasticizing the inner and major portion of the composition.

As hereinbefore indicated, the water to be used for plasticizing purposes may be added to powders or to thin sections of urea-formaldehyde condensation products and the resulting mixture may be made homogeneous by application of heat and pressure in the extrusion chamber of a molding apparatus. The extrusion operation itself greatly assists the combination of the resin with the water present. The presence of the water prevents the temperature in the extrusion chamber from stiffening the composition and permits extrusion to take place.

Since synaeresis must be retarded until the molding operation is effected, it is desirable in some instances that a special mix be employed to coat the surfaces of the material. This may be accomplished by coating the particles with resins, collodion, paraffin or any other suitable agent which is comparatively less permeable by water or solvents. If such coating materials are employed, the extrusion of the composition through the orifice of the molding machine mixes such coating material with the composition and no noticeable lack of homogeneity results.

Other methods contemplated for retaining the solvent in the molding composition, and hence for retaining its plasticity until the molding operation is effected, include the step of retaining the composition in a moist condition. It may be stored in a humid atmosphere or in an atmosphere of steam, such as in a sterilizer. Alternatively, it may be wrapped or covered with wax paper and kept in a closed container. Furthermore, it may be stored in a container provided that a moistening device, such as a moist sponge, is used, or the container may be lined with moist blotting paper. It should be kept in mind that all of these methods of preventing synaeresis are successful only if the composition is of the proper acidity, for if excessive acid is present, the tendency to throw off water is so great that no precaution can prevent loss of moisture and hardening of the material.

*Example 1*

A urea-formaldehyde condensation product made by reacting 2 mols of formaldehyde (formalin solution containing 40% by volume of formaldehyde and having a pH value of 4.6) with 1.33 mols of urea by maintaining the mass at a temperature of 30° C. for 30 minutes, was mixed with 40% by weight of alpha cellulose (based on the anhydrous mixture) in a Werner and Pfleiderer mixer and carefully dried at a temperature below 50° C. by passing air through the wet mass. The dried mass was then ground in a pebble mill together with the desired coloring matter. This material was capable of being molded at a temperature of about 140° C. using conventional pressures. This powder was then subjected to a drying operation by placing the same in an oven at a temperature of 100° C. and leaving the material there until no further loss in weight occurred. By this treatment the powder lost its flowing quality and could not be molded under the conventional conditions. The pH value of the powder, both before and after the last heat treatment was approximately 6.5.

The pH value of the powders was ascertained by mixing 5 grams of the same with 10 cc of distilled water, filtering the mixtures as quickly as possible and adding a few drops of Brom Thymol Blue to the filtrate. One minute after the mixture was poured into the filter the color of the filtrate was compared with color standards. The ascertainment of pH value must be done quickly, for after standing a while the pH value, originally at 6.5, increased to 7.7 or higher after about 10 minutes.

The dried material, which had lost its flowing qualities, was then introduced into a machine provided with hot differential rolls of the nature used in the compounding of rubber and the material worked for some time therein. One of the rolls was heated by steam, the steam gauge showing a reading of from 50 to 60 pounds, and the other roll contained cold water. At the time of measurement the hot roll showed a surface temperature of 120° C. whereas the "cold" roll was only 10–20° cooler. 20% by weight of water and sufficient formic acid, bringing the pH value to 5, was introduced with the powder and when this was done the particles of the powder began to coalesce and finally formed a continuous sheet of homogeneous appearance. Working of the material without the addition of water had no appreciable effect on the condition of the mass and the material remained in powder form or formed small flakes which dropped from the rolls as they rotated.

During the working of the water-containing material it was observed that the same always adhered to the cold roll, whereas, in contrast thereto, the urea-formaldehyde compositions made by prior processes invariably adhered to the hot roll.

At the temperature of the rolls the condensation or polymerization reaction progressed and water was continuously lost by evaporation. When a comparatively tough rubbery sheet had formed, it loosened from the cold roll and did not adhere to the hot roll. Working was continued until the amount of water was reduced to a point where the composition could be molded at a temperature of 140° C. At this point the sheet, if permitted to cool, became brittle, and hence it was difficult to work the same further or remove additional moisture. It could be ground only with great difficulty, for the material was extremely tough. No powder could be formed therefrom even if an impact pulverizer were used. The composition, however, possessed exceptionally good flowing qualities, although gassing was required for successful operation in most molds. The material quickly hardened in the hot mold and the molded product produced had a higher gloss and a much greater resistance to boiling water than the composition would have had, had it been molded without being treated to the intensive working and reaction treatment in the presence of water.

Because of the relatively high acidity of the composition it was not suitable for the production of articles in deep molds where extremely rapid curing is fatal. Furthermore the composition was suitable for use only within a few hours after its production, for if the material were permitted to stand overnight it stiffened and could not thereafter be molded except through use of excessive pressures.

In order to produce a material in a form in which it could be stored for a prolonged period before molding, the final working on the rolls was carried out with an addition of sufficient sodium hydroxide solution of 10% strength to bring the pH value of the material to about 6.5. The final water content and flowing characteristics of the molding composition were the same as those possessed by the composition of greater acidity. Other properties also, excepting stability of flow, were the same.

As alternative procedure to that described in the foregoing paragraph the composition of relatively high acidity was dried out in an oven or permitted to stand at room temperature for some time, after which it was broken up to provide a mass of coarse particles. This mass was then placed in a Werner and Pfleiderer mixer fitted with a cover on which mechanical or hydraulic pressure could be transmitted to the mass during the subsequent mixing operation (alternatively the process could be carried out in a Bambury mixer). During the mixing sufficient sodium hydroxide was added to bring the pH value to 6.5. Since no moisture is lost during the mixing operation, the desired water content and flow of the material is determined by the dryness of the sheeted material and the amount of water introduced with the sodium hydroxide solution. During the mixing operation the temperature was not permitted to rise above the points at which the mass was sufficiently plastic to permit ready working. The composition obtained had all of the desirable qualities of the above described materials, but it retained its ability to flow readily in the mold for an even greater period of time.

The above described sheeted materials were suitable for use in an injection molding machine. Such sheets possessed sufficient water to keep the composition from hardening for an indefinite period, when the same was placed in the closed hydraulic pressure chamber. In the injection molding machine the temperature was maintained lower than 140° C. although a temperature of that magnitude can be employed. The composition within the pressure chamber was then injected into a chilled or cold mold and the injected material quickly became sufficiently rigid to be removed readily from the mold, the molded article obtained not requiring any further curing process.

*Example 2*

The cellulose containing urea-formaldehyde condensation product produced in accordance with Example 1 was worked on heated rolls, hereinbefore referred to, with sufficient sodium hydroxide solution to bring the pH value to 6.5 and with an addition of 25% of the condensation product of cellulose acetate. The addition of the cellulose acetate led to the production of improved products having superior injection molding qualities. The product had more strength and rigidity, such that it could be more readily removed from the mold without breakage or distortion.

*Example 3*

To the material produced in Example 1 there was added 0.5% of an ammonium compound, such as ammonium sulfate or ammonium chloride. Thereafter the mixture was worked on the rolls and during such working a partial decomposition occurred and the ammonia ion part of the salt present reacted with formaldehyde present to form hydroxy methylene tetra-ammonia, leaving free acid present which accelerated the elimination of water and hardening.

If low temperatures are used during the mixing process, this acid formation is retarded or prevented, but takes place rapidly at the higher temperature of the hot molding process which follows. Potentially acidic substances may be added during the mechanical working operation but their addition is not ordinarily desirable in the production of injection molding compounds, for hardening is liable to take place in the heated injection chamber.

*Example 4*

Two thousand two-hundred and fifty grams of urea were refluxed with 4,500 cc. of a neutral solution of 40% formalin produced by adding sufficient potassium hydroxide to the formalin, originally having a pH value of 2.8, to raise the pH value to 7. The solution became cloudy shortly after the boiling began, the boiling being continued for a period of one hour. The resulting solution was then mixed with 1,500 grams of alpha cellulose powder, thereby impregnating the same, and the mixture was then dried at a temperature of 100° C. until there was no further loss in weight.

If an attempt were made to mold this material it would be found that it possessed insufficient flowing characteristics. This material after grinding was mechanically worked and treated as described in Example 1 to produce a completely reacted molding composition. This material also was suitable for use in processes of Examples 2 and 3.

Example 5

Nine hundred grams of urea were dissolved in 1800 cc. of commercial formalin solution and sufficient potassium hydroxide solution or other base was added to raise the pH value to about 5.6. The resulting mixture was then boiled in a reflux condenser for a period of about 3 hours, during which time the pH value dropped to about 5. When the viscosity had increased to a point indicated by a period of 12.5 seconds in a standard pipette (a 10 cc. pipette which delivers 10 cc. in 10 seconds at 25° C.) the application of heat was discontinued and the solution vacuum distilled, thereby causing the temperature to drop very rapidly to about 35° C. and thus arresting the reaction. At the end of the distillation it was found that the pH value had risen to 5.5, due primarily to the evaporation of formic acid. When a sample of the solution being vacuum distilled gave a well defined ball in cold water, the distillation operation was discontinued. The resulting cloudy, viscous, non-hydrophobe was then poured into shallow pans fitted with covers and placed in an oven at 65° C. The next day the mass was removed and found to have solidified.

The solidified material was cut into strips and worked on the hot rolls, in accordance with the procedure outlined in Example 1, until it gave a satisfactory product when molded under heat and pressure. The molded product was less rigid than that obtained in Example 1, for the rigidity there was due to the presence of cellulose. The instant composition had excellent flowing qualities for use as an injection molding compound, particularly when modified by a suitable addition of cellulose acetate.

As an alternative procedure the viscous non-hydrophobic material as produced above was solidified by working on the heated rolls, such working being continued until a product was obtained which gave a satisfactory molded product under heat and pressure.

Example 6

One and thirty-three hundredths mol of urea was mixed with just sufficient water to dissolve it and after warming to a temperature of about 50° C. was introduced into a solution warmed to the same temperature having a pH value of 3 and containing 2 mols of formalin, the introduction being made slowly at first and then more rapidly as the solution began to boil spontaneously from the heat of the reaction. All of the urea solution was added before gelatinization occurred. After gelatinization the material was cut into strips and then worked on the hot rolls in the manner described in Example 1. After the material had been worked through the rolls four or five times, sufficient sodium hydroxide solution of 10% strength was added to produce a pH value of 6 in the material being worked. The working of the product was continued until the water content and flow were adjusted to the proper level. The flowing characteristics of the molding composition were retained over a long period of time, and when it was molded transparent products of good quality were obtained.

Example 7

One mol of urea was dissolved in a little over 2 mols of neutralized formalin solution and heated to boiling under a reflux condenser for 20 minutes. Then sufficient formic acid was added to raise the acidity to a pH value of 4.6. The boiling was continued until there was a considerable increase in the viscosity of the solution. The resulting solution was then run into enameled pans and permitted to gelatinize. Before the gel had hardened, it was cut into strips and mechanically worked on the hot rolls as described in Example 1. Thereupon sufficient urea was added to bring the ratio of urea to 1.33 mols to 2 mols of formaldehyde and working on the hot rolls was continued until the reaction was complete and the water content was at a minimum or just sufficient to impart the required flowing characteristics to the composition. This composition was suitable for molding and gave transparent products.

Example 8

Nine hundred grams of urea were refluxed with 2560 cc. of 40% formalin solution having a pH value of 5.8. Five minutes after active boiling commenced 252 grams of thiourea were added and refluxing was continued for 2 hours. The mass was then vacuum distilled and when nearly all of the water present was removed 40 cc. of a 10% formic acid solution were added. Distillation was then continued until the solution was as viscous as possible and yet capable of being cast. The mass was then poured into molds where it soon gelatinized.

The gelatinized material obtained in this manner was worked on the hot rolls as described in Example 1. The high acidity of the mass and the heat of the rolls caused the reaction to continue and the water present to be evaporated. When the water content was such that the sheets obtained were plastic and rubbery when hot, but hard and rigid when cooled, the composition was in condition for use as an injection molding composition. The molding composition was suitable for use immediately, but could not be kept over any extended period of time due to the high acidity of the mass.

For the preparation of the condensation products of the present invention for use in paints, varnishes, lacquers or coating compositions, the same is worked up in a suitable apparatus either before, during or after the intensive mechanical working operation with suitable solvents and/or plasticizers, whereby either a solution or an emulsion is formed.

From the foregoing examples it will be observed that the invention relates primarily to the production of molding compositions, especially injection molding compositions, prepared by combining a urea-formaldehyde condensation product with the correct amount of water to form a plastic mass which is rigid and solid at ordinary temperatures but which flows rapidly under heat and pressure with the result that it can be molded. The condensation reaction is substantially complete and the resin itself possesses little or no flowing properties. The molding composition has the property of retaining its plasticity at elevated temperatures so long as the water is present, but as soon as the water is removed the product becomes set or infusible and is no longer thermoplastic.

Instead of urea, thiourea or substitution products of urea or of thiourea may be used insofar as they are not specifically limited, all of which I wish to be included along the urea in the designation "urea" used in the following claims. The formaldehyde may be used either in the commercial aqueous solution or in the gaseous state or in the form of a solution of anhydrous formaldehyde or the form of the polymers.

Thus while I have described my improvement in detail and with respect to certain preferred forms, I do not desire to be limited to such details or forms since, as will be noticed by those skilled in the art, after understanding my invention many changes and modifications may be made and the invention embodied in widely different forms without departing from the spirit and scope thereof in its broader aspects, and I desire to cover all modifications, forms and improvements coming within the scope of any one or more of the appended claims.

I claim:

1. In the production of molded, substantially completely reacted products of urea and formaldehyde, the process which comprises working between rolls a substantially dried, plastic urea formaldehyde condensation product in the presence of sufficient inert volatile liquid to form a coherent, flowable mass, said working being carried out under conditions of temperature and acidity which advance the reaction to substantial completion, and while the resulting mass containing the liquid is in a flowable state introducing the same into a mold which lowers the temperature of the mass, thereby causing the mass to set.

2. In the production of thermoplastic injection molding compositions from fusible reaction products of formaldehyde and urea produced through the reaction of approximately 2 mols of the former to 1.33 mols of the latter, the step which consists in mechanically working and squeezing the fusible product in the presence of an amount of water which provides a coherent, workable mass, the temperature and acidity of the mass during the working being such as to cause substantial completion of the reaction during the working operation, whereby a coherent thermoplastic mass is obtained containing sufficient physically admixed water to render it moldable, said mass being capable of becoming infusible solely and spontaneously by loss of said physically admixed water.

3. The process of preparing thermoplastic injection molding compositions of novel properties from solid fusible urea-formaldehyde molding compositions produced through the condensation of mixtures of approximately 2 mols of formaldehyde to 1.33 mols of urea, the steps which consist in mixing the solid fusible condensation product with water and at a pH value below 6, intensively and mechanically working the water containing mass until the reaction is substantially complete, the amount of liquid in said mixture being adjusted to permit proper flow of the material during injection molding, said mixture being capable of becoming infusible solely and spontaneously by loss of said water.

4. In the production of molded products of novel properties from partially reacted or fusible solid urea-formaldehyde condensation products derived by the condensation of 2 mols of formaldehyde with approximately 1.33 mols of urea, the steps which comprise reacting and mixing the solid condensation product at a pH value of from 4 to 6 with water and intensively and mechanically working such mixture until the reaction is substantially complete and the product physically combined with the water present, adjusting the water content to obtain proper flowing qualities, injecting the material obtained in this manner in warmed condition into a cooled mold to form a molded article and then drying the molded article after removing from the mold.

5. In the production of thermoplastic injection molded urea-formaldehyde condensation products the steps comprising, mechanically working and squeezing an inert volatile liquid containing fusible urea-formaldehyde condensation product to complete substantially the reaction, adjusting the amount of liquid present during said working and squeezing to yield a coherent thermoplastic product capable of being forced into and of flowing in a mold, molding and setting the resulting liquid containing condensation product in a mold cooler than the product so injected, thereby forming a shaped article capable without heating of spontaneously hardening upon loss of liquid.

6. In the production of thermoplastic urea-formaldehyde injection molding resins, the process of preparing a substantially completely reacted urea-formaldehyde condensation product which comprises mechanically working and squeezing a fusible condensation product of approximately 2 mols of formaldehyde with 1.33 mols of urea in the presence of sufficient inert volatile liquid to produce a coherent workable mass, said working being conducted under conditions of temperature and acidity to cause advancement in the reaction substantially to completion whereby upon cessation of working a substantially completely reacted, thermoplastic moldable cold-setting urea formaldehyde product is obtained containing physically combined liquid, said product being capable of spontaneously hardening upon loss of said liquid.

7. The process of producing molded urea-formaldehyde condensation products which comprises, subjecting a substantially completely reacted product of urea and formaldehyde containing sufficient inert, volatile liquid during the completion of the reaction to produce a readily flowable mass upon heating to a temperature at which the same becomes flowable, injecting such mass into a mold maintained at a lower temperature than that of the mass to solidify the mass and form a shaped article, said article having the property of hardening upon spontaneous loss of the liquid contained therein.

8. The process of producing molded urea formaldehyde condensation products which comprises substantially completing the reaction of a fusible urea-formaldehyde condensation product in the presence of about 8 to 20% water physically admixed therewith, and heating the same to a temperature at which a flowable mass is obtained, injecting such mass containing the water into a mold maintained at a lower temperature than that of the mass which causes the mass to solidify by cooling, said molded mass becoming hard and infusible upon evaporation of the water present.

9. A substantially completely reacted coherent urea-formaldehyde condensation product containing 8–20% free water, said product being permanently thermoplastic so long as water is retained therein and being capable of molding by lowering its temperature in the mold to form a coherent mass and of hardening by loss of said water.

10. A coherent, urea-formaldehyde molding composition composed of a substantially completely reacted urea formaldehyde condensation product containing more than 8% of physically admixed inert volatile liquid, said composition being capable of molding into shaped articles by injection into a mold maintained at a lower temperature at which the composition sets and of spontaneously hardening by loss of liquid after being molded.

11. A coherent, spontaneously hardening urea-formaldehyde resin molding composition containing at least 8% water, the urea-formaldehyde condensation product therein being reacted to a point where a heated mass of the same will set when cooled and where the set mass will spontaneously lose physically admixed water, thereby hardening and becoming infusible.

12. The process which comprises molding a heated, coherent water-containing substantially completely reacted urea-formaldehyde condensation product at a temperature which does not destroy its fusibility by injecting the same into a mold maintained at a temperature lower than the temperature at which the product sets, and then eliminating water from the molded product to produce an infusible, insoluble molded product.

13. An injection molding composition comprising a substantially completely reacted urea-formaldehyde resin plasticized with physically admixed water in sufficient quantity to render said composition flowable in injection molding, said composition being coherent, fusible and capable of setting at a temperature lower than the fusion temperature of the composition.

14. In the production of molded products of novel properties from partially reacted or fusible solid urea-formaldehyde condensation products derived by the condensation of 2 mols of formaldehyde with from 1.05 to 1.40 mols of urea, the steps which comprise reacting and mixing the solid condensation product at a pH value of from 4 to 6 with water and intensively and mechanically working such mixture until the reaction is substantially complete and the product physically combined with the water present, adjusting the water content to obtain proper flowing qualities, injecting the material obtained in this manner in warmed condition into a cooled mold to form a molded article and then drying the molded article after removing from the mold.

15. In the production of molded products of novel properties from partially reacted or fusible solid urea-formaldehyde condensation products derived by the condensation of 2 mols of formaldehyde with from 1.1 to 1.33 mols of urea, the steps which comprise reacting and mixing the solid condensation product at a pH value of from 4 to 6 with water and intensively and mechanically working such mixture until the reaction is substantially complete and the product physically combined with the water present, adjusting the water content to obtain proper flowing qualities, injecting the material obtained in this manner in warmed condition into a cooled mold to form a molded article and then drying the molded article after removing from the mold.

16. A coherent substantially completely reacted urea-formaldehyde condensation product containing at least 8% of a physically admixed inert volatile liquid and having a pH of about 6.5, said composition capable of being molded into shaped articles by injection into a mold maintained at a temperature lower than that at which the composition sets and capable of spontaneously hardening by loss of said liquid after being molded.

17. A self-sustaining thermoplastic molded substantially completely reacted urea-formaldehyde resin article containing 8-20% water, characterized by being capable of spontaneously losing water and thereby becoming infusible and insoluble.

18. A self-sustaining thermoplastic molded substantially completely reacted urea-formaldehyde resin article containing a physically admixed inert volatile liquid, characterized by being capable of spontaneously losing said liquid, thereby becoming infusible and insoluble.

19. A thermoplastic injection molding composition comprising a substantially completely reacted urea-formaldehyde resin plasticized with from 8 to 20% water physically admixed therewith, said water rendering said composition flowable in injection molding, and said composition becoming infusible upon losing water.

20. A thermoplastic injection molding composition comprising a substantially completely reacted urea-formaldehyde resin plasticized with a physically admixed inert volatile liquid in sufficient quantity to render said composition flowable in injection molding, said composition becoming infusible upon losing said inert liquid.

21. In the production of injection molded, substantially completely reacted products of urea and formaldehyde, the process which comprises mechanically working a substantially dry, plastic urea-formaldehyde condensation product in the presence of sufficient inert volatile liquid to form a coherent, flowable mass, said working being carried out under conditions of temperature and acidity which advance the reaction to substantial completion, and injecting the resulting mass containing the liquid in a warmed condition into a mold, and cooling the mass.

LEONARD SMITH.